United States Patent
Nakano

(10) Patent No.: US 11,897,292 B2
(45) Date of Patent: Feb. 13, 2024

(54) PNEUMATIC TIRE

(71) Applicant: Sumitomo Rubber Industries, Ltd., Kobe (JP)

(72) Inventor: Kazuhiro Nakano, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 469 days.

(21) Appl. No.: 17/086,793

(22) Filed: Nov. 2, 2020

(65) Prior Publication Data

US 2021/0197627 A1    Jul. 1, 2021

(30) Foreign Application Priority Data

Dec. 25, 2019    (JP) ................................ 2019-234859

(51) Int. Cl.
*B60C 13/02* (2006.01)
*B60C 13/04* (2006.01)
(Continued)

(52) U.S. Cl.
CPC ............ *B60C 13/02* (2013.01); *B60C 13/001* (2013.01); *B60C 15/0036* (2013.01); *B60C 2013/045* (2013.01)

(58) Field of Classification Search
CPC ..... B60C 13/00; B60C 13/002; B60C 13/001; B60C 13/02; B60C 15/0036; B60C 2015/009; B60C 13/04; B60C 2013/045
See application file for complete search history.

(56) References Cited

U.S. PATENT DOCUMENTS

| 1,448,286 A * | 3/1923 | Comstock | B29D 30/72 152/DIG. 12 |
| 2005/0016653 A1* | 1/2005 | Kajita | B60C 9/0207 152/451 |

(Continued)

FOREIGN PATENT DOCUMENTS

| JP | 05008612 A * | 1/1993 | ........... B60C 13/001 |
| JP | 2009090920 A * | 4/2009 | |

(Continued)

OTHER PUBLICATIONS

Machine Translation: JP-2012131283-A, Motogami F, (Year: 2022).*

(Continued)

*Primary Examiner* — Kendra Ly
(74) *Attorney, Agent, or Firm* — Birch, Stewart, Kolasch & Birch, LLP

(57) ABSTRACT

A pneumatic includes a pair of sidewall portions. At least one of the sidewall portions is provided on an outer surface thereof with a first protruding portion arranged on an outer side in a tire radial direction and a second protruding portion arranged on a radially inner side. Both protruding portions are formed so as to be convex outward in a tire axial direction. The second protruding portion has a protruding apex surface formed of a different colored rubber material having a different color from an outer surface of the first protruding portion. A distance in the tire radial direction between an inner edge in the tire radial direction of the first protruding portion and an outer edge in the tire radial direction of the second protruding portion is 40% or more and 220% or less of a length in the tire radial direction of the second protruding portion.

17 Claims, 3 Drawing Sheets

(51) Int. Cl.
    *B60C 15/00*     (2006.01)
    *B60C 11/01*     (2006.01)
    *B60C 13/00*     (2006.01)

(56) References Cited

U.S. PATENT DOCUMENTS

| | | |
|---|---|---|
| 2012/0073719 A1 | 3/2012 | Kurosawa |
| 2017/0210182 A1* | 7/2017 | Mori .................... B60C 13/002 |
| 2020/0001663 A1* | 1/2020 | Fujioka .................. B60C 13/02 |

FOREIGN PATENT DOCUMENTS

| | | | |
|---|---|---|---|
| JP | 2012-131283 A | | 7/2012 |
| JP | 2012131283 A | * | 7/2012 |
| JP | 2016084028 A | * | 5/2016 |
| JP | 2016088338 A | * | 5/2016 |
| JP | 2016-203420 A | | 12/2016 |

OTHER PUBLICATIONS

Machine Translation: JP-05008612-A, Yamashita B, (Year: 2022).*
Machine Translation: JP-2016088338-A, Sakata K, (Year: 2022).*
Machine translation: JP-2009090920-A, Ebiko M (Year: 2023).*
Machine translation: JP-2016084028-A, Takayama H (Year: 2023).*
Extended European Search Report, dated Apr. 8, 2021, for European Application No. 20209715.0.

\* cited by examiner

PNEUMATIC TIRE

TECHNICAL FIELD

The present invention relates to a pneumatic tire.

BACKGROUND ART

The following Patent Document 1 has proposed a pneumatic tire provided with a convex pattern on a sidewall portion. The pneumatic tire has a non-black rubber layer inside the sidewall portion and a portion of the non-black rubber layer is exposed on a raised surface of the convex pattern. Therefore, visibility of the convex pattern is improved. Further, the non-black rubber layer extends inside the sidewall portion so that it extends beyond the convex pattern inward and outward in a tire radial direction (see Patent Document 1, FIG. 8).

PRIOR ART DOCUMENT

Patent Document

[Patent Document 1]
Unexamined Japanese Patent Application No. 2016-203420

SUMMARY OF THE INVENTION

Problems to be Solved by the Invention

In recent years, there may be a case where it is preferred to form protruding portions that are convex in a tire axial direction on an outer surface of the sidewall portion separately on an inner side and an outer side in the tire radial direction. In one example, the protruding portion formed on the radially outer side is, for example, a so-called buttress design portion, and the protruding portion formed on the radially inner side is, for example, the convex pattern as described above.

For example, there is a demand for increasing the size of the buttress design portion in the tire radial direction in order to improve the appearance of the tire. In such a case, it is possible that the non-black rubber layer penetrates into the buttress design portion inside the sidewall portion. The non-black rubber is significantly inferior in cut resistance to the black rubber which is reinforced with carbon black and constitutes the main part of the tire. Therefore, the above-described structure of the sidewall portion has a problem that the cut resistance of the buttress design portion is decreased. Further, when a cut scratch is generated on the buttress design portion, there is a problem that the non-black rubber is exposed to the outside from the buttress design portion which was not originally intended.

The present invention was made in view of the above, and a primary object thereof is to provide a pneumatic tire capable of improving the cut resistance and the appearance of the sidewall portion.

Means for Solving the Problems

The present invention is a pneumatic tire including a pair of sidewall portions, wherein at least one of the pair of the sidewall portions is provided on an outer surface thereof with a first protruding portion arranged on an outer side in a tire radial direction and a second protruding portion arranged on an inner side in the tire radial direction, each of the first protruding portion and the second protruding portion is formed so as to be convex outward in a tire axial direction, the second protruding portion has a protruding apex surface formed of a different colored rubber material having a different color from that of an outer surface of the first protruding portion, and a distance ($d1$) in the tire radial direction between an inner edge in the tire radial direction of the first protruding portion and an outer edge in the tire radial direction of the second protruding portion is 40% or more and 220% or less of a length ($L1$) in the tire radial direction of the second protruding portion.

In the pneumatic tire according to the present invention, it is preferred that the distance ($d1$) between the radially inner edge of the first protruding portion and the radially outer edge of the second protruding portion is 60% or more and 140% or less of the radial length ($L1$) of the second protruding portion.

In the pneumatic tire according to the present invention, it is preferred that a maximum protruding height of the first protruding portion is 20% or less of the distance ($d1$) between the radially inner edge of the first protruding portion and the radially outer edge of the second protruding portion.

In the pneumatic tire according to the present invention, it is preferred that the first protruding portion includes an inner side surface extending from the inner edge at an angle of 15 degrees or more and 80 degrees or less in a lateral cross section passing through a rotational axis of the tire.

In the pneumatic tire according to the present invention, it is preferred that the first protruding portion is a buttress design portion including a serration pattern in which linear protrusions are arranged.

In the pneumatic tire according to the present invention, it is preferred that the first protruding portion includes a protector extending in a tire circumferential direction at a buttress portion.

In the pneumatic tire according to the present invention, it is preferred that the second protruding portion is a mark portion which shows a character or a symbol.

In the pneumatic tire according to the present invention, it is preferred that the different colored rubber material includes an extended portion extending radially outward beyond the second protruding portion in the at least one of the sidewall portions.

Effects of the Invention

On the outer surface of the sidewall portion of the pneumatic tire according to the present invention, the first protruding portion on the radially outer side and the second protruding portion on the radially inner side thereof are formed so as to be each convex axially outward. The second protruding portion has the protruding apex surface formed of the different colored rubber material having a different color from that of the outer surface of the first protruding portion, In the pneumatic tire according to the present invention, the distance ($d1$) in the tire radial direction between the radially inner edge of the first protruding portion and the radially outer edge of the second protruding portion is 40% or more and 220% or less of the length ($L1$) of the second protruding portion. Thereby, the different colored rubber material is arranged spaced enough apart from the first protruding portion. Therefore, the cut resistance around the inner edge of the first protruding portion is improved. Further, the different colored rubber material prevented from being exposed externally near the inner edge of the first protruding portion, therefore, the appearance of the sidewall portion is improved.

Furthermore, in the present invention, since the upper limit of the distance (d1) is set to 220% of the length (L1), the first protruding portion can be enlarged in the tire radial direction, therefore, the appearance of the sidewall portion can be further improved.

MODE FOR CARRYING OUT THE INVENTION

An embodiment of the present invention will now be described in conjunction with accompanying drawings.

Figure 1:
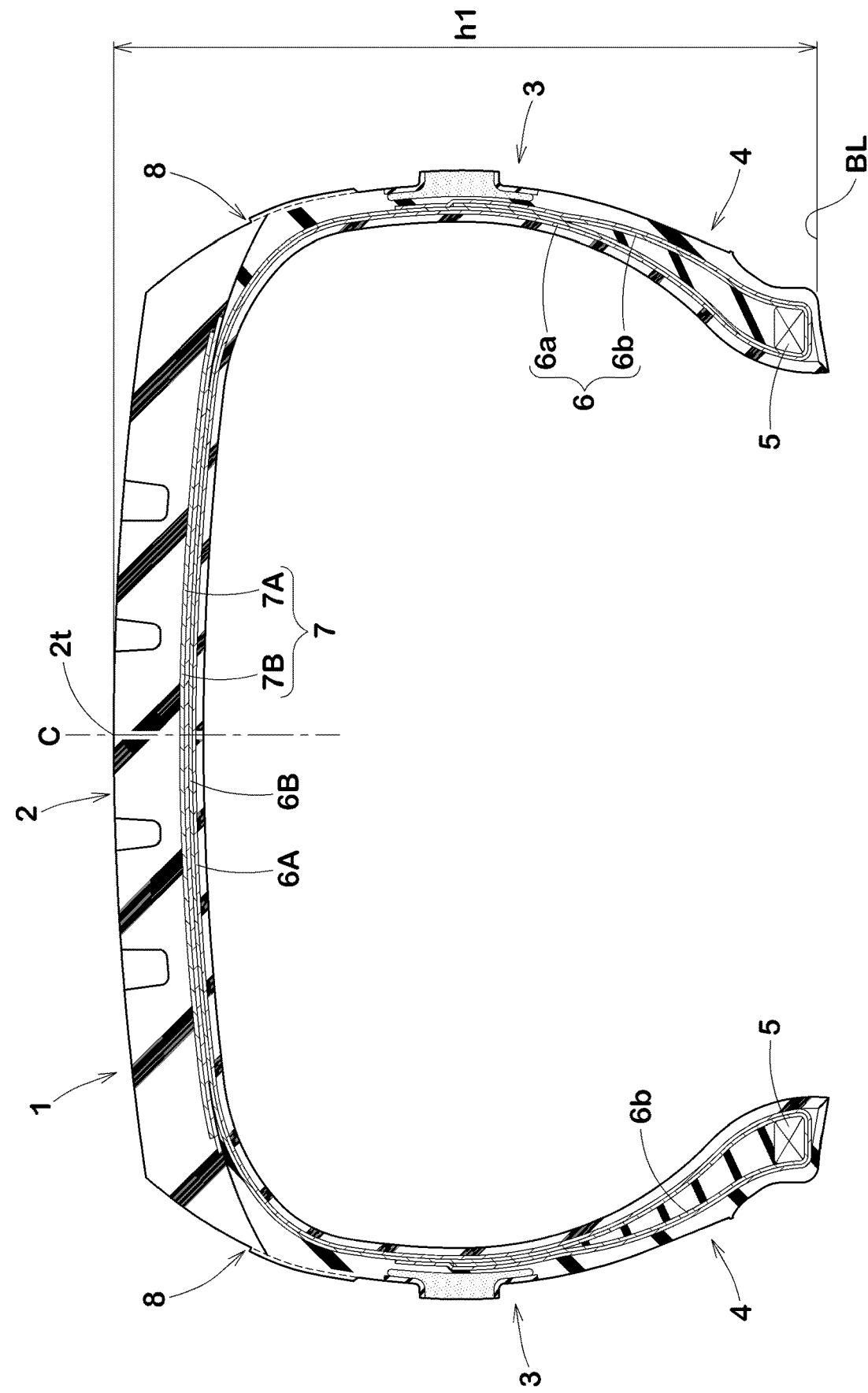
FIG. 1 a lateral cross-sectional view showing a tire according to an embodiment of the present invention.

FIG. 1 shows a lateral cross-sectional view of a pneumatic tire 1 of the present embodiment in a standard state (hereinafter, may be simply referred to as "tire"). It should be noted that FIG. 1 is the lateral cross-sectional view passing through a rotational axis of the tire. As shown in FIG. 1, the tire 1 of the present embodiment is suitably used for an SUV which is intended for driving on both paved roads and rough terrain, for example. However, the present invention is not limited to such an embodiment.

The "standard state" is a state in which the tire is mounted on a standard rim (not shown), inflated to a standard inner pressure, and loaded with no tire load. Hereinafter, dimensions and the like of various parts of the tire are those measured under the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

The tire 1 of the present embodiment is provided with a tread portion 2, a pair of sidewall portions 3, a pair of bead portions 4 in which a bead core 5 is embedded in each, and a carcass 6 extending between the bead portions 4 in a toroidal manner.

The carcass 6 is formed by a first carcass ply (6A) and a second carcass ply (6B), for example. Each of the first carcass ply (6A) and the second carcass ply (6B) includes carcass cords and a topping rubber covering the carcass cords. The carcass cords are arranged at an angle of 75 degrees or more and 90 degrees or less with respect to a tire circumferential direction, for example. Organic fiber cords such as nylon, polyester or rayon, for example, are suitably used as the carcass cords.

The carcass 6 has a main body portion (6a) and turned up portions (6b). The main body portion (6a) extends between the bead cores 5 of the pair of the bead portions 4. The turned up portions (6b) are connected with the main body portion (6a) and are each turned up around the respective bead core 5 so as to extend radially outward. Each of the turned up portions (6b) of the present embodiment is turned up around the respective bead core 5 from the inside to the outside in the tire axial direction. Further, in each of the turned up portions (6b), an outer end of the first carcass ply (6A) and an outer end of the second carcass ply (6B) are displaced in the tire radial direction.

The tread portion 2 of the present embodiment includes a belt layer 7, for example. The belt layer 7 includes two belt plies (7A) and (7B), for example. Each of the belt plies (7A) and (7B) includes belt cords arranged obliquely with respect to the tire circumferential direction and the topping rubber covering the belt cords, for example. It is preferred that each of the belt cords is inclined at an angle of 10 degrees or more and 45 degrees or less with respect to the tire circumferential direction.

Figure 2:
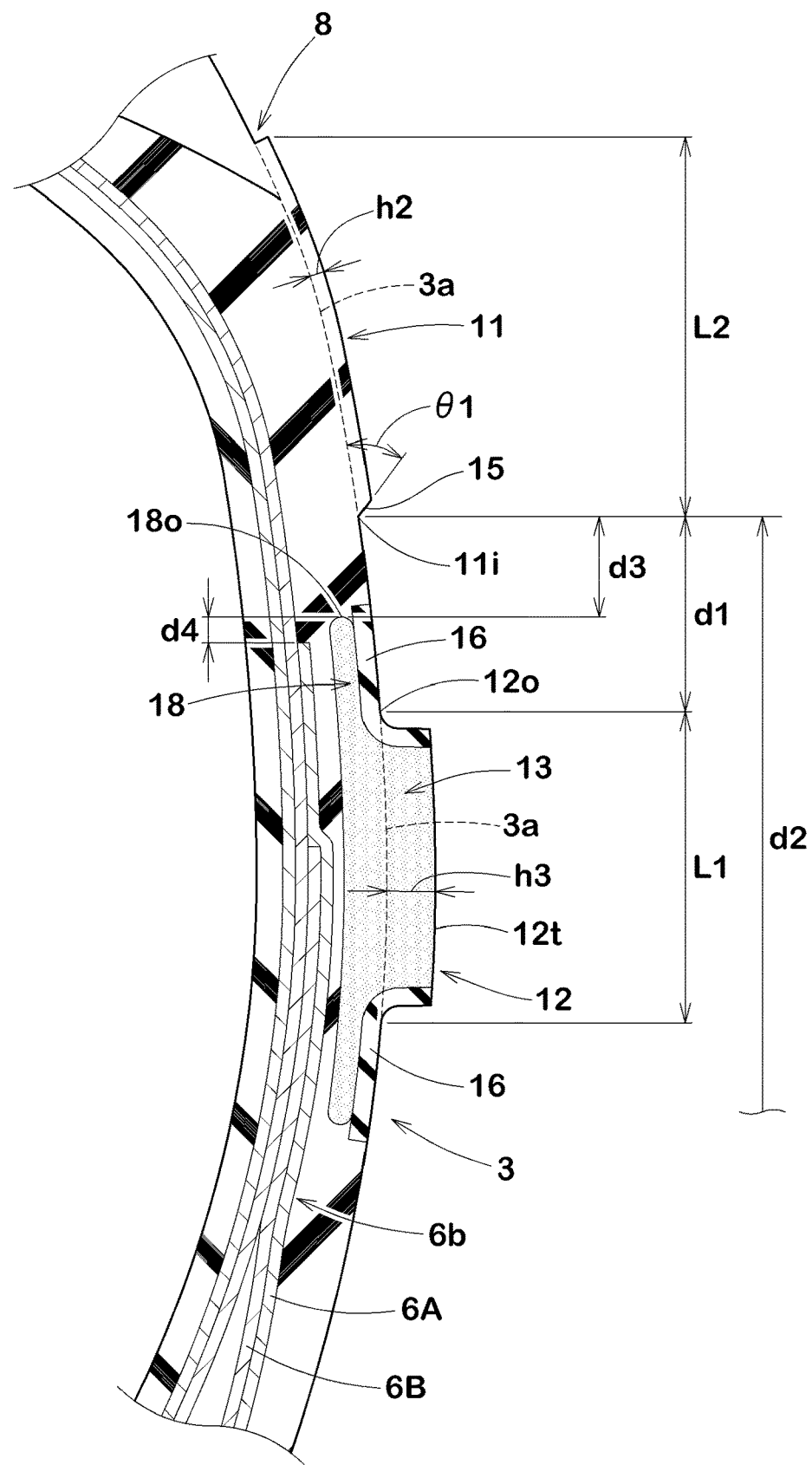
FIG. 2 an enlarged cross-sectional view of one of the sidewall portions of FIG. 1.

FIG. 2 shows an enlarged cross-sectional view of one of the sidewall portions 3. As shown in FIG. 2, at least one of the sidewall portions 3 is provided on an outer surface thereof with a first protruding portion 11 formed on the outer side in the tire radial direction and a second protruding portion 12 formed on the inner side in the tire radial direction. Each of the first protruding portion 11 and the second protruding portion 12 is formed so as to be convex outwardly in the tire axial direction from a reference profile (3a) of the sidewall portion 3. It should be noted that the reference profile (3a) is a profile of the outer surface of the sidewall portion 3 when the first protruding portion 11 and the second protruding portion 12 are not provided, and it is formed by a smooth curved surface, for example.

A protruding apex surface (12t) of the second protruding portion 12 is formed of a different colored rubber material 13 having a different color from that of the outer surface of the first protruding portion 11. In the present embodiment, the entirety of the tire, including the outer surface of the first protruding portion 11, is formed of black rubber, and the different colored rubber material 13 is white rubber.

In the present invention, a distance (d1) in the tire radial direction between an inner edge (11i) in the tire radial direction of the first protruding portion and an outer edge (12o) in the tire radial direction of the second protruding portion 12 is 40% or more and 220% or less of a length (L1) in the tire radial direction of the second protruding portion.

Thereby, the different colored rubber material 13 is arranged spaced enough apart from the first protruding portion 11. Therefore, the cut resistance around the inner edge (11i) of the first protruding portion 11 is improved. In addition, in general, if the first protruding portion 11 and the second protruding portion 12 are arranged in close proximity to each other, the area with a small thickness between them is likely to be locally deformed and damage is likely to occur in said area. In the present invention, since the distance between the first protruding portion 11 and the second protruding portion 12 is ensured, local deformations in the area between them are suppressed and the durability is improved. By these actions, the different colored rubber material 13 is prevented from being exposed externally near the inner edge (11i) of the first protruding portion 11, therefore, the appearance of the sidewall portions 3 is improved.

Further, in the present invention, since the upper limit of the distance (d1) is set to 220% of the length (L1), the first protruding portion 11 can be enlarged in the tire radial direction, therefore, the appearance of the sidewall portions 3 can be further improved.

In order to ensure the above effect to be exerted, it is preferred that the distance (d1) is 60% or more and 140% or less of the length (L1).

The first protruding portion 11 is formed of black rubber entirely. Thereby, the area on the radially inner side of the first protruding portion 11 is formed of black rubber.

The first protruding portion 11 is formed as a pattern formed by letters, symbols or figures. The first protruding portion 11 of the present embodiment is configured as a buttress design portion including a serration pattern in which a plurality of linear protrusions is arranged. The first protruding portion 11 may include a protector extending in the tire circumferential direction at the buttress portion 8. It should be noted that the buttress portion 8 is a region of each of the sidewall portions 3 which is relatively close to the respective edge of the tread portion 2 (shown in FIG. 1).

The first protruding portion 11 is arranged radially outside a respective one of maximum width positions of the tire 1, for example. A distance (d2) in the tire radial direction between a bead baseline (BL) (shown in FIG. 1) and the inner edge (11i) of the first protruding portion 11 is 60% or more and 80% or less of a tire section height (h1) (shown in FIG. 1, and the same applies hereinafter), for example. It should be noted that, as shown in FIG. 1, the bead baseline (BL) means a tire axial direction line which passes through a rim diameter position as defined by the standard on which the tire is based. The tire section height (h1) is equal to the distance in the tire radial direction between the bead baseline (BL) and an outer end (2t) in the tire radial direction of the tread portion 2.

As shown in FIG. 2, a maximum protruding height (h2) of the first protruding portion 11 is 20% or less, preferably 3% or more and 10% or less, of the distance (d1), for example. Thereby, the different colored rubber material 13 of the second protruding portion 12 is made difficult to move toward the first protruding portion 11, therefore, the different colored rubber material 13 can be prevented from being exposed near the inner edge (11i) of the first protruding portion 11.

In the same regard, it is preferred that a length (L2) in the tire radial direction of the first protruding portion 11 is 10% or more and 20% or less of the tire section height (h1), for example.

The first protruding portion 11 includes an inner side surface 15 extending from the inner edge (Ii). The inner side surface 15 is inclined radially outward as it goes axially outward in a lateral cross section passing through a rotational axis of the tire. An angle θ1 of the inner side surface 15 with respect to the reference profile (3a) is, for example, 15 degrees or more and 80 degrees or less, and preferably 30 degrees or more and 50 degrees or less. Therefore, the cut resistant performance at the inner edge (11i) of the first protruding portion 11 is improved.

The second protruding portion 12 is formed to include the maximum width positions of the tire, for example. However, the present invention is not limited to an embodiment like this.

The length (L1) in the tire radial direction of the second protruding portion 12 is 5% or more and 15% or less of the tire section height (h1), for example. It is preferred that a maximum protruding height (h3) of the second protruding portion 12 is greater than the maximum protruding height (h2) of the first protruding portion 11. The protruding height (h3) of the second protruding portion 12 is 2.0 to 5.0 times the protruding height (h2) of the first protruding portion 11, for example. Thereby, the different colored rubber material 13 is made difficult to move toward the first protruding portion 11.

Figure 3A:
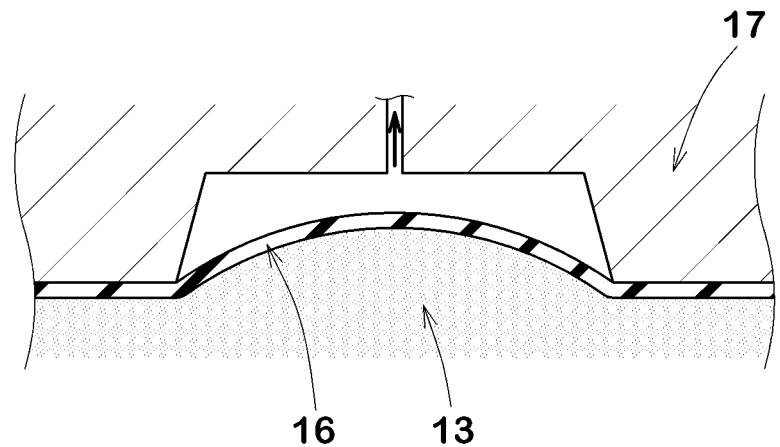
FIG. 3A an explanatory diagram showing a process of vulcanization molding a second protruding portion.
Figure 3B:
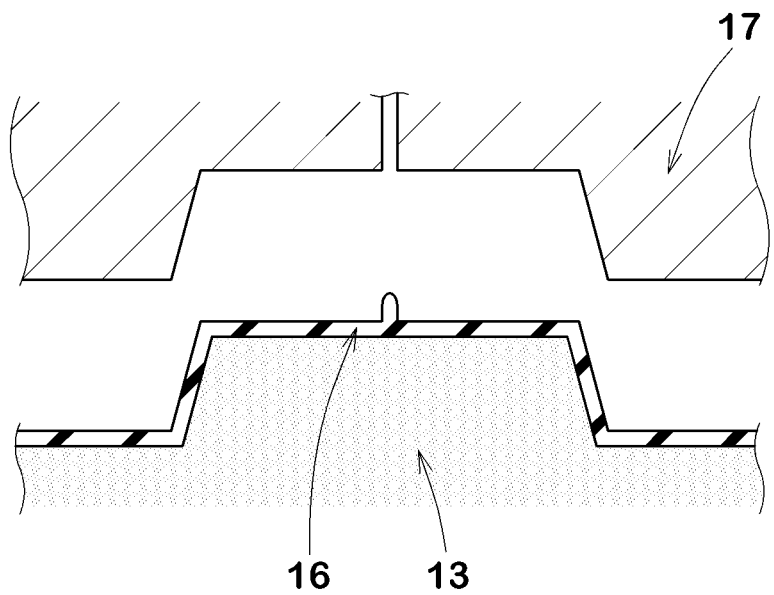
FIG. 3B an explanatory diagram showing the process of vulcanization molding the second protruding portion.
Figure 3C:
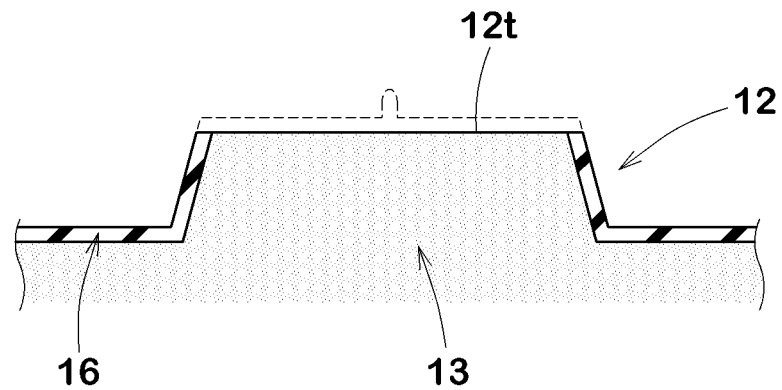
FIG. 3C an explanatory diagram showing the process of vulcanization molding the second protruding portion.

FIGS. 3A to 3C are explanatory diagrams showing the process of forming the second protruding portion 12 at the time of manufacturing the tire. As shown in FIGS. 3A to 3C, the second protruding portion 12 is formed by vulcanizing, in a vulcanization mold 17, the different colored rubber material 13 and a cover rubber layer 16 formed of black rubber and covering the different colored rubber material 13. After vulcanization molding, the cover rubber layer 16 arranged on an upper surface of the second protruding portion 12 is removed by buffing or other means to form a protruding apex surface (12t) formed of the different colored rubber material 13.

Thus, as shown in FIG. 2, the second protruding portion 12 has the protruding apex surface (12t) formed of a different colored rubber material 13 and the side surfaces formed of the cover rubber layer 16 made of black rubber.

The different colored rubber material 13 includes an extended portion 18 extending radially outward beyond the second protruding portion 12 in the sidewall portions 3. A distance (d3) in the tire radial direction between the inner edge (11i) of the first protruding portion 11 and an outer end (18o) in the tire radial direction of the extended portion 18 is, for example, 30% or more, and preferably 40% or more of the distance (d1). Therefore, the different colored rubber material 13 can be surely prevented from being exposed around the inner edge (11i) of the first protruding portion 11. On the other hand, if the distance (d3) is excessively large, it is possible that the black rubber remains on the protruding apex surface (12t) of the second protruding portion 12. Thereby, the distance (d3) is, for example, 70% or less, and preferably 60% or less of the distance (d1).

It is preferred that each of the tined up portions (6b) of the carcass 6 is arranged axially inside the respective extended portion 18. In the present embodiment, each of the turned up portions (6B) of only the first carcass ply (6A) is arranged axially inside the respective extended portion 18. Further, each of the turned up portions (6b) of the second carcass ply (6B) is arranged axially inside the second protruding portion 12. More specifically, the radially outer end of each of the turned up portions (6b) of the second carcass ply (6B) is arranged radially inside the outer edge (12o) of the respective second protruding portion 12. Therefore, the rigidity around the extended portion 18 is moderately increased, thereby, the deformation around the extended portion 18 is suppressed. Therefore, delamination of the cover rubber layer 16 in the area between the first protruding portion 11 and the second protruding portion 12 is prevented.

A distance (d4) in the tire radial direction between the outer end (18o) of the extended portion 18 and the outer end of the turned up portion (6b) is, for example, 20% or less, preferably 15% or less of the distance (d1). As a result, the above-described action and effect can be surely obtained.

While detailed description has been made of the pneumatic tire as a preferred embodiment of the present invention, the present invention can be embodied in various forms without being limited to the illustrated specific embodiment.

Working Examples (Examples)

Pneumatic tires of size 265/70R17 having the basic configuration shown in FIG. 1 were made by way of test according to the specifications listed in Table 1. As References 1 to 3, tires were made by way of test in which the radial distance (d1) between the radially inner edge of the first protruding portion and the radially outer edge of the second protruding portion is less than 40% of the length (L1) in the tire radial direction of the second protruding portion. The tires in the References 1 to 3 had substantially the same configuration as the tires in Examples, except for the configuration described above. Each of the test tires was tested for the cut resistant performance. The common specifications of each of the test tires and the test methods were as follows.

Tire rim: 17×8.0
Tire inner pressure: 220 kPa

<Cut Resistant Performance>

The test tires were run at a constant speed on a drum testing machine under a constant longitudinal load. Further, the test tires were run until damage such as a cut occurred in the area between the first protruding portion and the second protruding portion, and the running distance of the tire at the time the damage occurred was measured. The results are indicated by an index based on the running distance of the Reference 1 being 100, wherein a larger numerical value means the better cut resistant performance of the sidewall portions.

The test results are shown in Tables 1 and 2.

TABLE 1

| | Ref. 1 | Ref. 2 | Ref. 3 | Ex. 1 | Ex. 2 | Ex. 3 | Ex. 4 | Ex. 5 | Ex. 6 |
|---|---|---|---|---|---|---|---|---|---|
| Distance (d1) between First protruding portion and Second protruding portion/Length (L1) of Second protruding portion [%] | 10 | 20 | 30 | 130 | 40 | 80 | 140 | 160 | 220 |
| Angle θ1 of inner side surface of First protruding portion [degree] | 40 | 40 | 40 | 40 | 40 | 40 | 40 | 40 | 40 |
| Distance (d3) between Inner edge of First protruding portion and Outer end of Extended portion/Distance (d1) [%] | 50 | 50 | 50 | 50 | 50 | 50 | 50 | 50 | 50 |
| Cut resistant performance [index] | 100 | 102 | 106 | 118 | 111 | 116 | 118 | 119 | 120 |

TABLE 2

| | Ex. 7 | Ex. 8 | Ex. 9 | Ex. 10 | Ex. 11 | Ex. 12 | Ex. 13 | Ex. 14 |
|---|---|---|---|---|---|---|---|---|
| Distance (d1) between First protruding portion and Second protruding portion/Length (L1) of Second protruding portion [%] | 130 | 130 | 130 | 130 | 130 | 130 | 130 | 130 |
| Angle θ1 of inner side surface of First protruding portion [degree] | 15 | 30 | 50 | 80 | 40 | 40 | 40 | 40 |
| Distance (d3) between Inner edge of First protruding portion and Outer end of Extended portion/Distance (d1) [%] | 50 | 50 | 50 | 50 | 30 | 40 | 60 | 70 |
| Cut resistance performance [index] | 119 | 119 | 118 | 116 | 115 | 117 | 118 | 118 |

From the test results, it was confirmed that the tires in the Examples exerted excellent cut resistant performance. Further, it was confirmed that, in each of the test tires in the Examples, the length of the first protruding portion was sufficiently secured and the appearance of the sidewall portions was also improved.

DESCRIPTION OF REFERENCE SIGNS 3 sidewall portion
11 first protruding portion
11i inner edge
12 second protruding portion
12t protruding apex surface
12o outer edge
13 different colored rubber material

The invention claimed is:
1. A pneumatic tire comprising:
a pair of sidewall portions;
a pair of bead portions in which a bead core is embedded in each,
a carcass extending between the bead portions in a toroidal manner,
wherein
at least one of the pair of the sidewall portions is provided on an outer surface thereof with a first protruding portion arranged on an outer side in a tire radial direction and a second protruding portion arranged on an inner side in the tire radial direction,
each of the first protruding portion and the second protruding portion is formed so as to be convex outward in a tire axial direction,
the second protruding portion has a protruding apex surface formed of a different colored rubber material having a different color from that of an outer surface of the first protruding portion,
a distance (d1) in the tire radial direction between an inner edge in the tire radial direction of the first protruding portion and an outer edge in the tire radial direction of the second protruding portion is 40% or more and 220% or less of a length (L1) in the tire radial direction of the second protruding portion,
the different colored rubber material includes an extended portion extending radially outward beyond the second protruding portion in the at least one of the sidewall portions,
the carcass has a main body portion and turned up portions,
the main body portion extends between the bead cores of the pair of the bead portions,
the turned up portions are connected with the main body portion and are each turned up around the respective bead core from the inside to the outside in the tire axial direction so as to extend radially outward,
at least one of the turned up portions of the carcass is arranged axially inside the extended portion, and
a distance in the tire radial direction between an outer end in the tire radial direction of the extended portion and an outer end in the tire radial direction of the at least one of the turned up portions is 20% or less of the distance (d1) between the radially inner edge of the first protruding portion and the radially outer edge of the second protruding portion.

2. The pneumatic tire according to claim 1, wherein the distance (d1) between the radially inner edge of the first protruding portion and the radially outer edge of the second protruding portion is 60% or more and 140% or less of the radial length (L1) of the second protruding portion.

3. The pneumatic tire according to claim 1, wherein the first protruding portion is a buttress design portion including a serration pattern in which linear protrusions are arranged.

4. The pneumatic tire according to claim 1, wherein the first protruding portion includes a protector extending in a tire circumferential direction at a buttress portion.

5. The pneumatic tire according to claim 1, wherein the second protruding portion is a mark portion which shows a character or a symbol.

6. The pneumatic tire according to claim 1, wherein a distance in the tire radial direction between a bead baseline and the radially inner edge of the first protruding portion is 60% or more and 80% or less of a tire section height.

7. The pneumatic tire according to claim 1, wherein a length in the tire radial direction of the first protruding portion is 10% or more and 20% or less of a tire section height.

8. The pneumatic tire according to claim 1, wherein the second protruding portion is formed so as to include a maximum width position of the tire.

9. The pneumatic tire according to claim 1, wherein the length (L1) in the tire radial direction of the second protruding portion is 5% or more and 15% or less of a tire section height.

10. The pneumatic tire according to claim 1, wherein a distance in the tire radial direction between the radially inner edge of the first protruding portion and an outer end in the tire radial direction of the extended portion is 30% or more and 70% or less of the distance (d1) between the radially inner edge of the first protruding portion and the radially outer edge of the second protruding portion.

11. The pneumatic tire according to claim 1, wherein
the carcass is formed by a first carcass ply and a second carcass ply, and
in the at least one of the turned up portions, only the first carcass ply is arranged axially inside the extended portion.

12. The pneumatic tire according to claim 11, wherein in the at least one of the turned up portions, a radially outer end of the turned up portion of the second carcass ply is arranged radially inside the outer edge of the second protruding portion.

13. The pneumatic tire according to claim 1, wherein
the first protruding portion includes an inner side surface extending from the inner edge at an angle of 15 degrees or more and 80 degrees or less with respect to a reference profile of the sidewall portion in a lateral cross section passing through a rotational axis of the tire, and
the reference profile is a profile of the outer surface of the or each sidewall portion when the first protruding portion and the second protruding portion are not provided.

14. The pneumatic tire according to claim 13, wherein the angle of the inner side surface is 30 degrees or more and 50 degrees or less.

15. The pneumatic tire according to claim 1, wherein a maximum protruding height of the first protruding portion is 20% or less of the distance (d1) between the radially inner edge of the first protruding portion and the radially outer edge of the second protruding portion.

16. The pneumatic tire according to claim 15, wherein the maximum protruding height of the first protruding portion is 3% or more and 10% or less of the distance (d1) between the radially inner edge of the first protruding portion and the radially outer edge of the second protruding portion.

17. The pneumatic tire according to claim 15, wherein a maximum protruding height of the second protruding portion is not less than 2.0 times and not more than 5.0 times the maximum protruding height of the first protruding portion.

* * * * *